United States Patent
Tai et al.

(10) Patent No.: US 10,209,698 B2
(45) Date of Patent: Feb. 19, 2019

(54) CALIBRATION METHOD AND AUTOMATION MACHINING APPARATUS USING THE SAME

(71) Applicant: INDUSTRIAL TECHNOLOGY RESEARCH INSTITUTE, Hsinchu (TW)

(72) Inventors: Chung-Li Tai, Tainan (TW); Yao-Yang Tsai, Kaohsiung (TW); Jay Huang, Tainan (TW); Ko-Shyang Wang, Kaohsiung (TW); Chih-Kai Chiu, Douliu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 478 days.

(21) Appl. No.: 14/696,049

(22) Filed: Apr. 24, 2015

(65) Prior Publication Data

US 2016/0187863 A1 Jun. 30, 2016

(30) Foreign Application Priority Data

Dec. 26, 2014 (TW) .............................. 103145868 A

(51) Int. Cl.
*G05B 19/401* (2006.01)
*G06T 7/80* (2017.01)

(52) U.S. Cl.
CPC .............. *G05B 19/401* (2013.01); *G06T 7/85* (2017.01); *G05B 2219/37015* (2013.01);
(Continued)

(58) Field of Classification Search
CPC ........ G05B 17/02; G05B 19/401; G06T 7/85; G06T 2207/10012; G06T 2207/30167; G06F 15/7803
See application file for complete search history.

(56) References Cited

U.S. PATENT DOCUMENTS 5,085,502 A 2/1992 Womack et al.
5,160,977 A * 11/1992 Utsumi ................ G01B 11/002
356/394
(Continued)

FOREIGN PATENT DOCUMENTS

CN 1256990 A 6/2000
CN 102129678 A 7/2011
(Continued)

OTHER PUBLICATIONS

Intellectual Property Office, Ministry of Economic Affairs, R. O. C, "Office Action", dated Jul. 12, 2016, Taiwan.
(Continued)

*Primary Examiner* — Robert E Fennema
*Assistant Examiner* — Santosh R Poudel
(74) *Attorney, Agent, or Firm* — Locke Lord LLP; Tim Tingkang Xia, Esq.

(57) ABSTRACT

A calibration method applicable for an automation machining apparatus includes building a first stereoscopic characteristic model corresponding to an object, obtaining a stereoscopic image of the object, building a second stereoscopic characteristic model corresponding to the object based on the stereoscopic image, obtaining at least one error parameter corresponding to the second stereoscopic characteristic model by comparing the second stereoscopic characteristic model with the first stereoscopic characteristic model, and calibrating a machining parameter of the automation machining apparatus based on the at least one error parameter.

8 Claims, 7 Drawing Sheets

(52) U.S. Cl.
CPC ............ *G05B 2219/37563* (2013.01); *G06T 2207/10012* (2013.01); *G06T 2207/30164* (2013.01)

(56) References Cited

U.S. PATENT DOCUMENTS

| | | | |
|---|---|---|---|
| 5,216,504 | A | 6/1993 | Webb et al. |
| 5,297,238 | A | 3/1994 | Wang et al. |
| 5,341,439 | A | 8/1994 | Hsu |
| 5,374,830 | A | 12/1994 | Pryor |
| 5,380,978 | A | 1/1995 | Pryor |
| 5,960,125 | A | 9/1999 | Michael et al. |
| 5,978,080 | A | 11/1999 | Michael et al. |
| 5,978,521 | A | 11/1999 | Wallack et al. |
| 6,016,161 | A | 1/2000 | Robinson |
| 6,101,455 | A | 8/2000 | Davis |
| 6,459,700 | B1 * | 10/2002 | Hoang .................... H04L 12/46 370/352 |
| 6,731,382 | B2 | 5/2004 | Jackson et al. |
| 6,839,972 | B2 | 1/2005 | Jackson et al. |
| 6,898,306 | B1 | 5/2005 | Lu |
| 6,931,340 | B2 | 8/2005 | Jackson et al. |
| 6,959,253 | B2 | 10/2005 | Jackson et al. |
| 6,968,282 | B1 | 11/2005 | Jackson et al. |
| 6,974,964 | B1 | 12/2005 | Wang |
| 7,065,892 | B2 | 7/2006 | Fleming et al. |
| 7,084,386 | B2 | 8/2006 | Bernardini et al. |
| 7,121,011 | B2 | 10/2006 | Murray et al. |
| 7,889,906 | B2 | 2/2011 | Smith et al. |
| 7,974,462 | B2 | 7/2011 | Takemoto et al. |
| 8,111,904 | B2 | 2/2012 | Wallack et al. |
| 8,126,260 | B2 | 2/2012 | Wallack et al. |
| 8,237,935 | B2 | 8/2012 | Nygaard et al. |
| 8,379,014 | B2 | 2/2013 | Wiedemann et al. |
| 8,472,703 | B2 | 6/2013 | Takemoto et al. |
| 2001/0033328 | A1 | 10/2001 | Martel et al. |
| 2002/0027651 | A1 | 3/2002 | Jackson et al. |
| 2002/0189115 | A1 | 12/2002 | Jackson et al. |
| 2003/0012410 | A1 | 1/2003 | Navab et al. |
| 2003/0053659 | A1 | 3/2003 | Pavlidis et al. |
| 2003/0065466 | A1 | 4/2003 | Jackson et al. |
| 2003/0144765 | A1 | 7/2003 | Habibi et al. |
| 2003/0156189 | A1 | 8/2003 | Utsumi et al. |
| 2004/0152233 | A1 | 8/2004 | Nemets et al. |
| 2005/0078304 | A1 | 4/2005 | Dorrance et al. |
| 2006/0038829 | A1 | 2/2006 | Morichi et al. |
| 2007/0081315 | A1 * | 4/2007 | Mondor .................. G06F 13/409 361/788 |
| 2007/0081714 | A1 | 4/2007 | Wallack et al. |
| 2007/0081716 | A1 * | 4/2007 | Ha ........................ H04N 13/144 382/154 |
| 2007/0096763 | A1 | 5/2007 | Ehrmann et al. |
| 2007/0213873 | A1 * | 9/2007 | Ban ........................ B25J 9/1656 700/245 |
| 2008/0013823 | A1 | 1/2008 | Behnke et al. |
| 2008/0031514 | A1 | 2/2008 | Kakinami |
| 2008/0119978 | A1 | 5/2008 | Stieff et al. |
| 2008/0285802 | A1 | 11/2008 | Bramblet et al. |
| 2008/0292131 | A1 | 11/2008 | Takemoto et al. |
| 2008/0298672 | A1 | 12/2008 | Wallack et al. |
| 2009/0052760 | A1 * | 2/2009 | Smith .................... A61N 5/1049 382/132 |
| 2009/0096790 | A1 | 4/2009 | Wiedemann et al. |
| 2010/0165116 | A1 * | 7/2010 | Hsieh ........................ G06T 7/73 348/187 |
| 2010/0201806 | A1 | 8/2010 | Nygaard et al. |
| 2010/0245593 | A1 | 9/2010 | Kim et al. |
| 2011/0169918 | A1 * | 7/2011 | Yoo .................... H04N 13/0239 348/46 |
| 2011/0280472 | A1 | 11/2011 | Wallack et al. |
| 2012/0162414 | A1 | 6/2012 | Zhang et al. |
| 2012/0229377 | A1 * | 9/2012 | Kim ........................ G06F 3/017 345/157 |
| 2012/0257016 | A1 * | 10/2012 | Nakajima ............... G06T 17/20 348/46 |
| 2014/0029808 | A1 * | 1/2014 | Lee .................... G06K 9/00362 382/110 |
| 2014/0098199 | A1 | 4/2014 | Yeatman, Jr. et al. |
| 2014/0111645 | A1 | 4/2014 | Shylanski et al. |
| 2014/0118500 | A1 | 5/2014 | Liu et al. |
| 2015/0265852 | A1 * | 9/2015 | Meir .................... A61N 5/1049 600/1 |
| 2017/0308055 | A1 * | 10/2017 | Hoshino .............. G05B 19/409 |

FOREIGN PATENT DOCUMENTS

| | | |
|---|---|---|
| CN | 102950510 A | 3/2013 |
| CN | 103499297 A | 1/2014 |
| JP | 2010244551 A | 10/2010 |
| TW | 200617805 | 6/2006 |
| TW | M448341 U | 3/2013 |

OTHER PUBLICATIONS

Bo Li et al., A Multiple-Camera System Calibration Toolbox Using A Feature Descriptor-Based Calibration Pattern, 2013 IEEE/RSJ International Conference on Intelligent Robots and Systems, 2013.

Federico Pedersini et al., Calibration and Self-Calibration of Multi-Ocular Camera Systems, proceedings of the International Workshop on Synthetic-Natural Hybrid Coding and Three Dimensional Imaging, 1997.

Volker Kirschner et al., Self-Calibrating Shape-Measuring System Based on Fringe Projection, Proceedings of SPIE—The International Society for Optical Engineering, 1997, 3102, 5-13.

* cited by examiner

CALIBRATION METHOD AND AUTOMATION MACHINING APPARATUS USING THE SAME

CROSS-REFERENCE TO RELATED APPLICATIONS

This non-provisional application claims priority under 35 U.S.C. § 119(a) on Patent Application No(s). 103145868 filed in Taiwan, R.O.C. on Dec. 26, 2014, the entire contents of which are hereby incorporated by reference.

TECHNICAL FIELD

The disclosure relates to a calibration method and an automation machining apparatus using the same, more particularly to a calibration method using stereoscopic image and an automation machining apparatus using the same.

BACKGROUND

Nowadays, the automation machining apparatus is used in the automatic production line for processing the object to be processed. With the advantage of saving the human resource, the automation machining apparatus has some disadvantages. Specifically, the automation machining apparatus processes, drills, or digs the object based on the preset parameters such as the coordinate depicting the processing position corresponding to the object. However, the position relationship between the automation machining apparatus and the object may vary from time to time. When the position relationship varies, errors may occur in the processing over the object.

SUMMARY

According to an embodiment, a calibration method applicable for an automation machining apparatus includes the steps of: building a first stereoscopic characteristic model corresponding to an object, obtaining a stereoscopic image of the object, building a second stereoscopic characteristic model corresponding to the object based on the stereoscopic image, obtaining at least one error parameter corresponding to the second stereoscopic characteristic model by comparing the second stereoscopic characteristic model with the first stereoscopic characteristic model, and calibrating a machining parameter of the automation machining apparatus based on the at least one error parameter.

According to another embodiment, an automation machining apparatus includes an image capturing device for obtaining a stereoscopic image of an object, a storage device for storing a first stereoscopic characteristic model corresponding to the object, a controlling device, and a working device. The controlling device includes a modeling module electrically coupled to the image capturing device for building a second stereoscopic characteristic model of the object based on the stereoscopic image and a calibrating module electrically coupled to both of the modeling module and the storage device for obtaining an error parameter by comparing the first stereoscopic characteristic model with the second stereoscopic characteristic model, and for calibrating an machining parameter of the automation machining apparatus based on the error parameter. The working device is electrically coupled to the calibrating module in the controlling device and used for processing the object based on the machining parameter.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
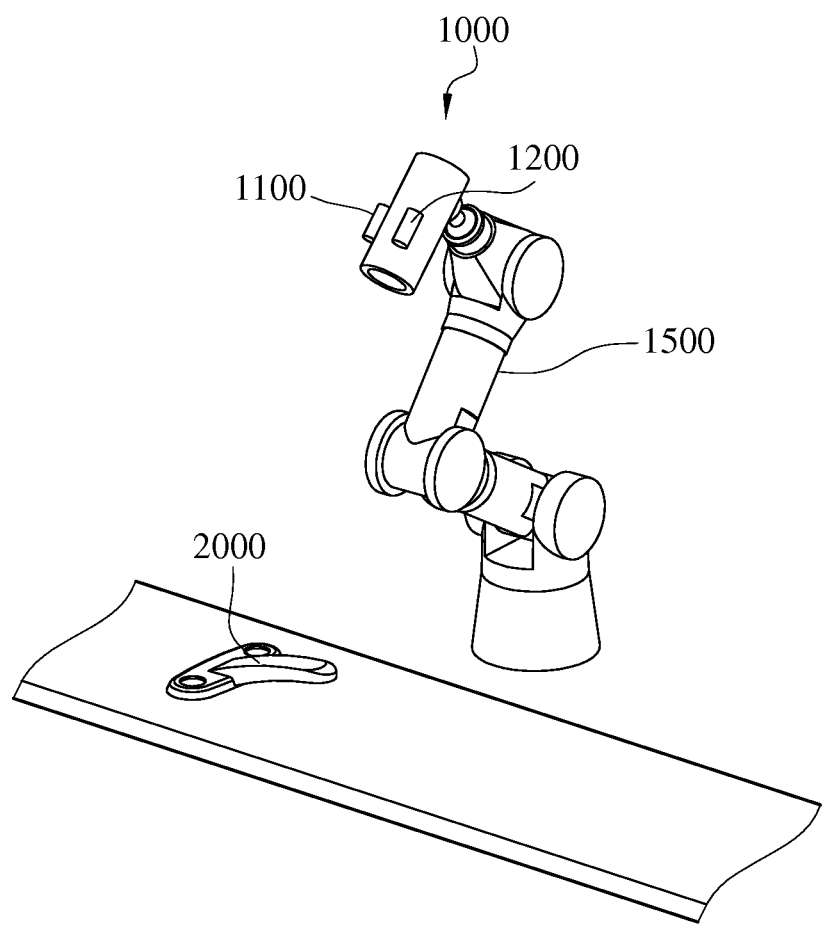
FIG. 1 is for illustrating an automation machining apparatus in one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
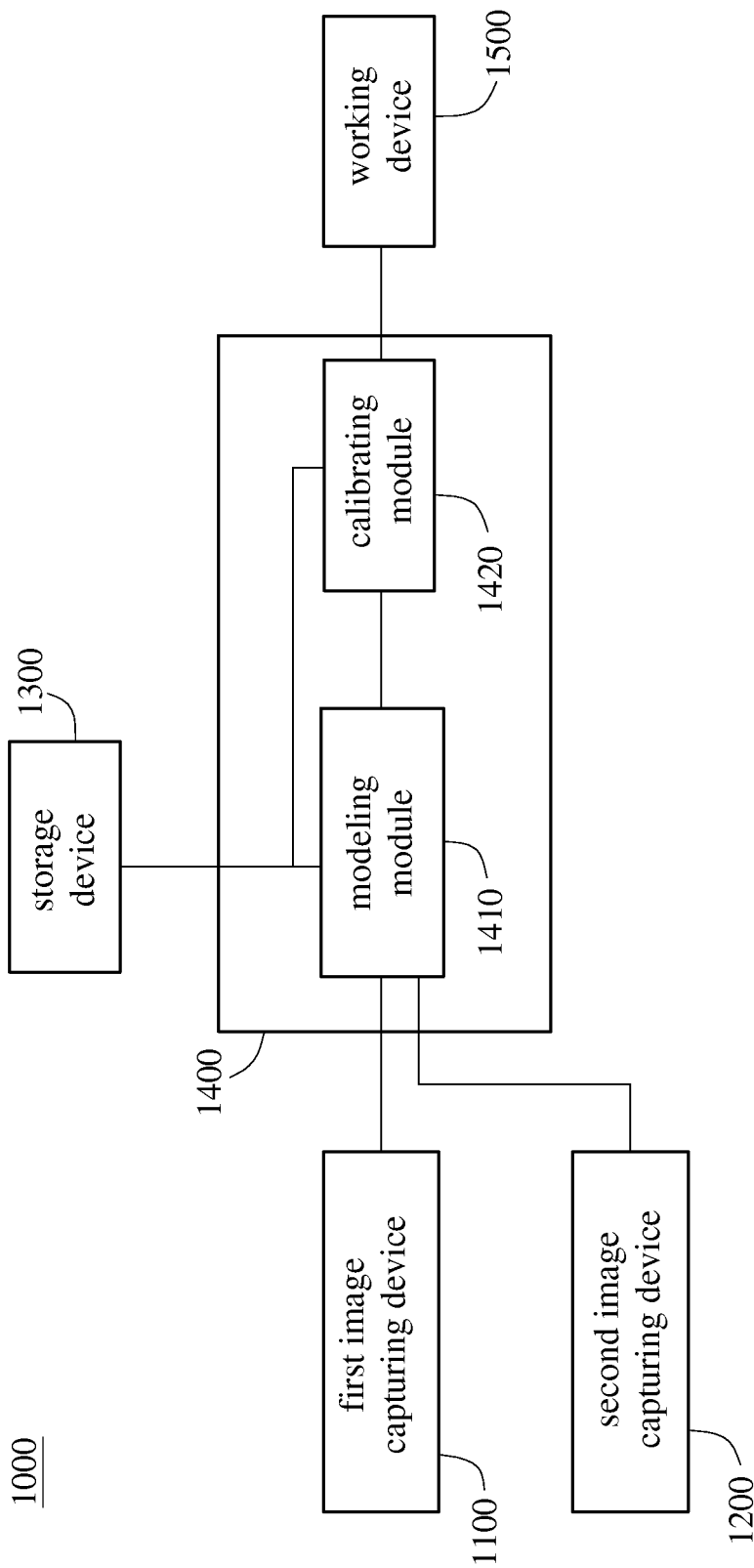
FIG. 2 is a functional block diagram of the automation machining apparatus in FIG. 1.

Please refer to FIG. 1 and FIG. 2, wherein FIG. 1 is for illustrating an automation machining apparatus in one embodiment, and FIG. 2 is a functional block diagram of the automation machining apparatus in FIG. 1. In one embodiment, as shown in FIG. 1 and FIG. 2, the automation machining apparatus 1000 includes a first image capturing device 1100, a second image capturing device 1200, a storage device 1300, a controlling device 1400, and a working device 1500. The controlling device 1400 is respectively electrically coupled to the first image capturing device 1100, the second image capturing device 1200, the storage device 1300, and the working device 1500.

The first image capturing device 1100 is used for obtaining a first image of an object 2000 while the second image capturing device 1200 is used for obtaining a second image of the object 2000. A spatial relationship between the first image capturing device 1100 and the second image capturing device 1200 is substantially fixed. As shown in FIG. 1, the first image capturing device 1100 and the second image capturing device 1200 respectively capture the first image of the object 2000 and the second image of the object 2000. Each of the first image and the second image is a two-dimension image. The aforementioned object 2000 is a work piece to be processed by the automation machining apparatus 1000 such as a building block of a motorcycle, of a car, or of a consuming electronic device, or any other products capable of being automatically produced.

The storage device 1300 is used for storing a first stereoscopic characteristic model corresponding to the object 2000 and the aforementioned spatial relationship. In one embodiment, in the stage of tuning the automation machining apparatus 1000, the user captures two two-dimension images corresponding to the object 2000 with different view angles by the first image capturing device 1100 and the second image capturing device 1200, so an stereoscopic image corresponding to the object 2000 is obtained and the first stereoscopic characteristic model corresponding to the object 2000 is built based on the stereoscopic image. The built first stereoscopic characteristic model is called a standard stereoscopic characteristic model of the object 2000. Specifically, the obtained stereoscopic image is obtained based on two two-dimension images captured from two image capturing device with different view angles, and the spatial coordinate, equivalent to the spatial position, of each characteristic node of the object 2000 is embedded in the stereoscopic image, so the first stereoscopic characteristic model has the coordinate information of the spatial position (the first spatial position) of each characteristic node of the object 2000. In other words, the first stereoscopic characteristic model has a plurality of pieces of first information (coordinate information) corresponding to a plurality of first characteristic nodes (the characteristic nodes of the object 2000). The first stereoscopic characteristic model and the spatial relationship between the first image capturing device 1100 and the second image capturing device 1200 are both stored in the storage device 1300.

In one embodiment, the controlling device 1400 includes a modeling module 1410 and a calibrating module 1420. The modeling module 1410 is electrically coupled to the first image capturing device 1100, the second image capturing device 1200, and the storage device 1300. The modeling module 1410 is used for building the second stereoscopic characteristic model corresponding to the object 2000 based on the stereoscopic image obtained based on the first image, the second image, and the aforementioned spatial relationship. Specifically, when the automation machining apparatus 1000 is working, the modeling module 1410 builds the second stereoscopic characteristic model of each object 2000 to be processed with the aforementioned manner. In other words, the second stereoscopic characteristic model of each object 2000 has a plurality of pieces of information corresponding to a plurality of characteristic nodes of the object 2000 to be processed, wherein the information here is namely the second information and the characteristic nodes here are called second characteristic nodes and the second information contains the coordinate information of the spatial position (the second spatial position) of each characteristic node of the object 2000 to be processed. Hence, if a position relationship between the automation machining apparatus 1000 and the object 2000 varied, the built second stereoscopic characteristic model is different from the first stereoscopic characteristic model. The position relationship varies when the position of the automation machining apparatus 1000 moves, or when the view angle of the image capturing device changes, or when the object 2000 itself rotates. In other words, the coordinate of the spatial position of each characteristic node among the plurality of characteristic nodes of the second stereoscopic characteristic model is then different from the coordinate of the spatial position of its corresponding characteristic node among the plurality of characteristic nodes of the first stereoscopic characteristic model.

The calibrating module 1420 is electrically coupled to the modeling module 1410 and the storage device 1300, and is used for comparing the first stereoscopic characteristic model with the second stereoscopic characteristic model to obtain an error parameter corresponding to the second stereoscopic characteristic model and adjusting the machining parameter of the automation machining apparatus 1000 based on the error parameter.

When the position relationship between the automation machining apparatus 1000 and the object 2000 varies, the second stereoscopic characteristic model corresponding to the object 2000 is different from the first stereoscopic characteristic model corresponding to the object 2000 (the standard stereoscopic characteristic model). The coordinate differences between the plurality of spatial coordinates about the plurality of characteristic nodes of the second stereoscopic characteristic model and the plurality of spatial coordinates about the plurality of characteristic nodes of the first stereoscopic characteristic model can then be calculated. A shifting matrix and/or a rotating matrix is then calculated based on the aforementioned coordinate differences so that the shifting matrix and/or the rotating matrix is capable of converting the second stereoscopic characteristic model into a stereoscopic characteristic model overlapping the first stereoscopic characteristic model. In one embodiment, the shifting matrix and the rotating matrix, alone or in combination, can be taken as a coordinate conversion matrix. The shifting matrix and/or the rotating matrix is then used for adjusting the machining parameter of the automation machining apparatus 1000. Because the machining parameter records a plurality of spatial positions of the object 2000, related to the automation machining apparatus 1000, to be processed which is also called spatial working positions, the variation of the spatial position of the object 2000 to be processed is therefore calibrated. In the above embodiments, a binocular 3D scanner consists of the first image capturing device 1100 and the second image capturing device 1200.

Figure 3:
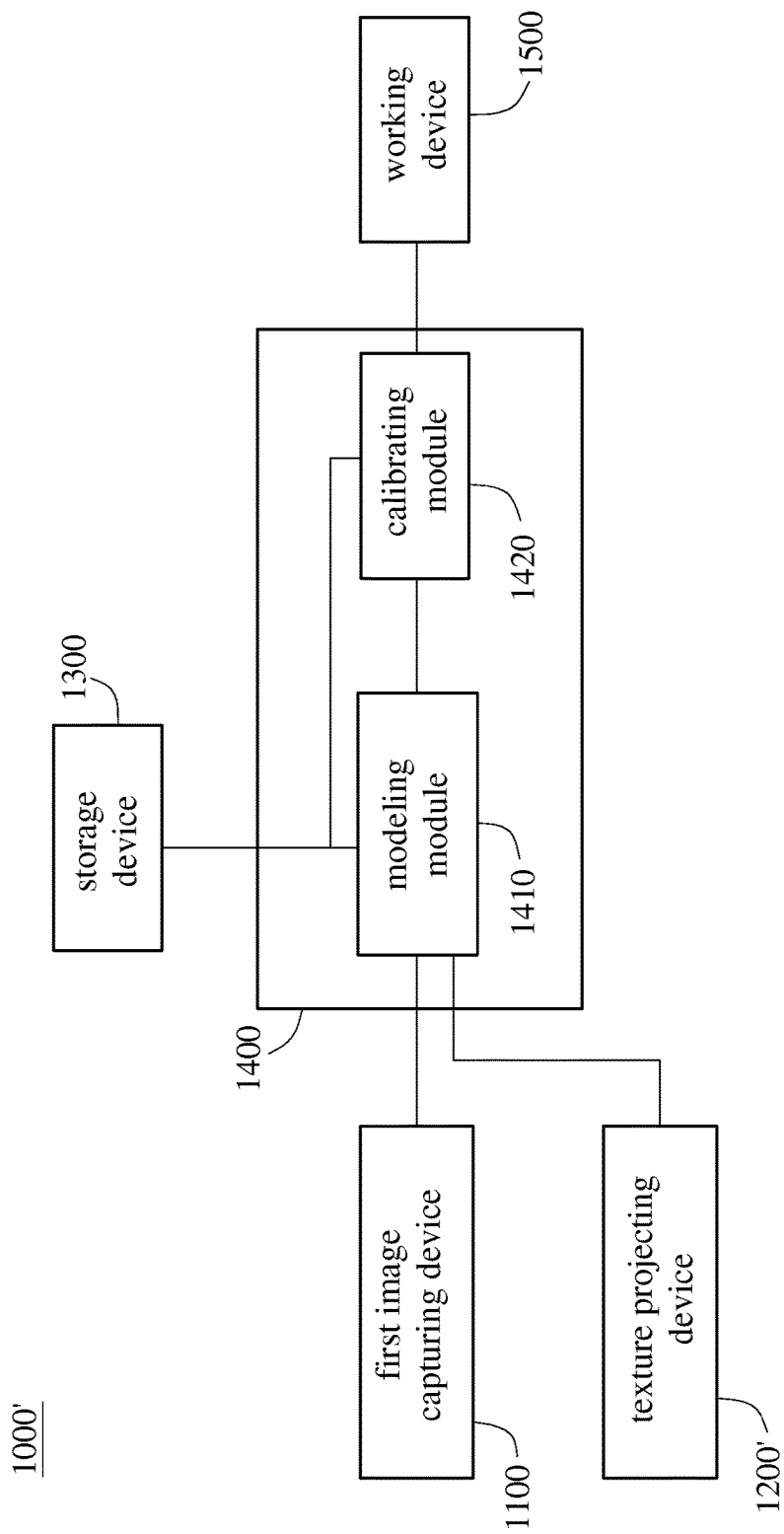
FIG. 3 is a functional block diagram of the automation machining apparatus in one embodiment.

In another embodiment, please refer to FIG. 3, which is a functional block diagram of the automation machining apparatus in one embodiment. As shown in FIG. 3, in the automation machining apparatus 1000', the aforementioned second image capturing device 1200 is replaced by a texture projecting device 1200'. The texture projecting device 1200' projects one or more preset spots/texture shadings onto the surface of the object 2000, and the first image capturing device 1100 captures image from the object 2000.

Figure 4:
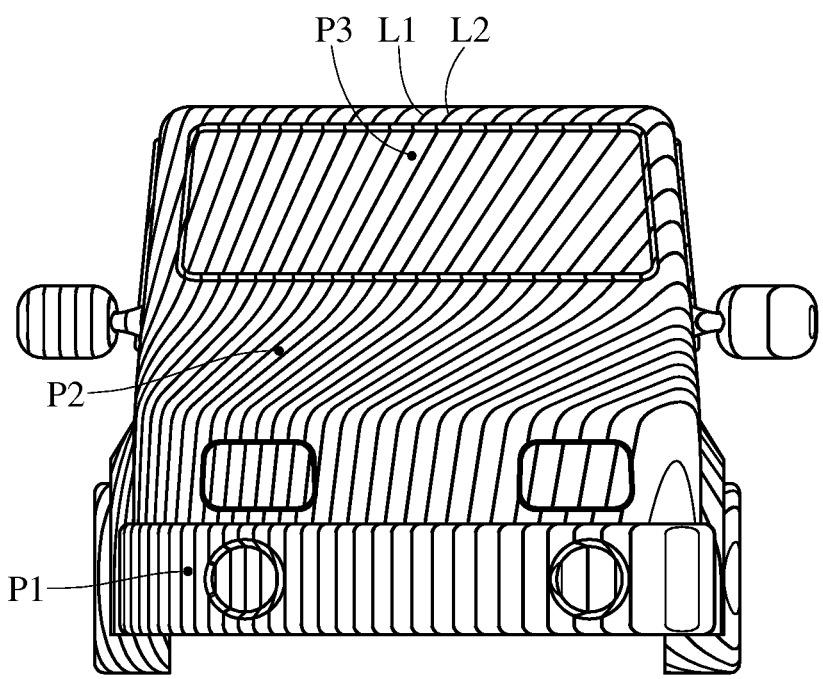
FIG. 4 is an image of an object corresponding to FIG. 3 in one embodiment.

Please refer to FIG. 4, which is an image of an object corresponding to FIG. 3 in one embodiment. In the embodiment, the car is the object 2000 in the aforementioned embodiments. A plurality of parallel straight bright lines are projected onto the car from the right front side of the car and the image of the car is captured from the front side of the car. Each of the projected bright lines distorts because of the shape of the surface of the car, so the stereoscopic image of the car is calculated based on the distortion of the bright lines in captured image and the preset shape of the bright lines stored in the storage device 1300. For example, the first line L1 and the bright line L2 in FIG. 4 are two adjacent shading lines in parallel. Based on FIG. 4, the distance between the first line L1 and the second line L2 around the point P1 is less than the distance between the first line L1 and the second line L2 around the point P2. The distance between the first line L1 and the second line L2 around the point P2 is less than the distance between the first line L1 and the second line L2 around the point P3. Hence, the distance from the point P1 to the image capturing device 1100 is less than the distance from the point P2 to the image capturing device 1100, and the distance from the point P2 to the image capturing device 1100 is less than the distance from the point P3 to the image capturing device 1100. Besides, the slope of the hook of the car and the slope of the window of the car is determined based on the slope of the line(s) around the point P2 and around the point P3. The stereoscopic image of the car is therefore built.

In one embodiment, when the texture projecting device 1200' is not projecting spots onto the object 2000, the first image capturing device 1100 catches the two-dimension image of the object 2000. Specifically, in the present embodiment, a texture projecting 3D scanner consists of the first image capturing device 1100 and the texture projecting device 1200'. The other operations corresponding, such as how to generate the second stereoscopic characteristic model, how to obtain the error parameter, and how to calibrate the machining parameter, are substantially similar to the embodiment previously discussed.

Figure 5A:
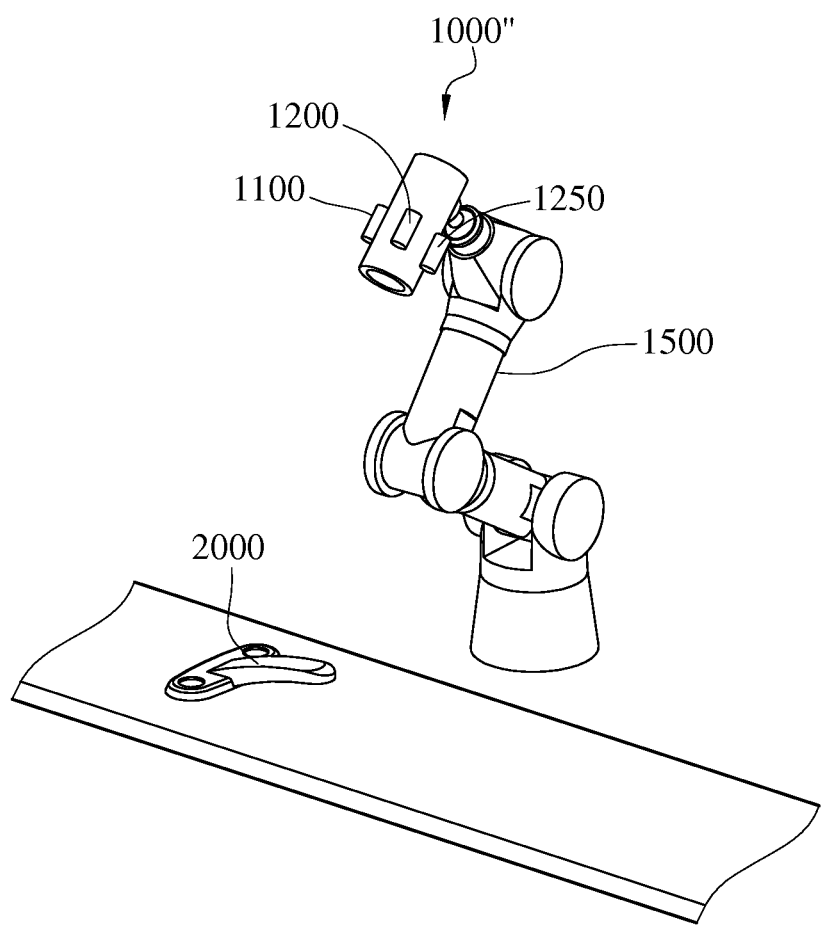
FIG. 5A is for illustrating an automation machining apparatus in one embodiment.
Figure 5B:
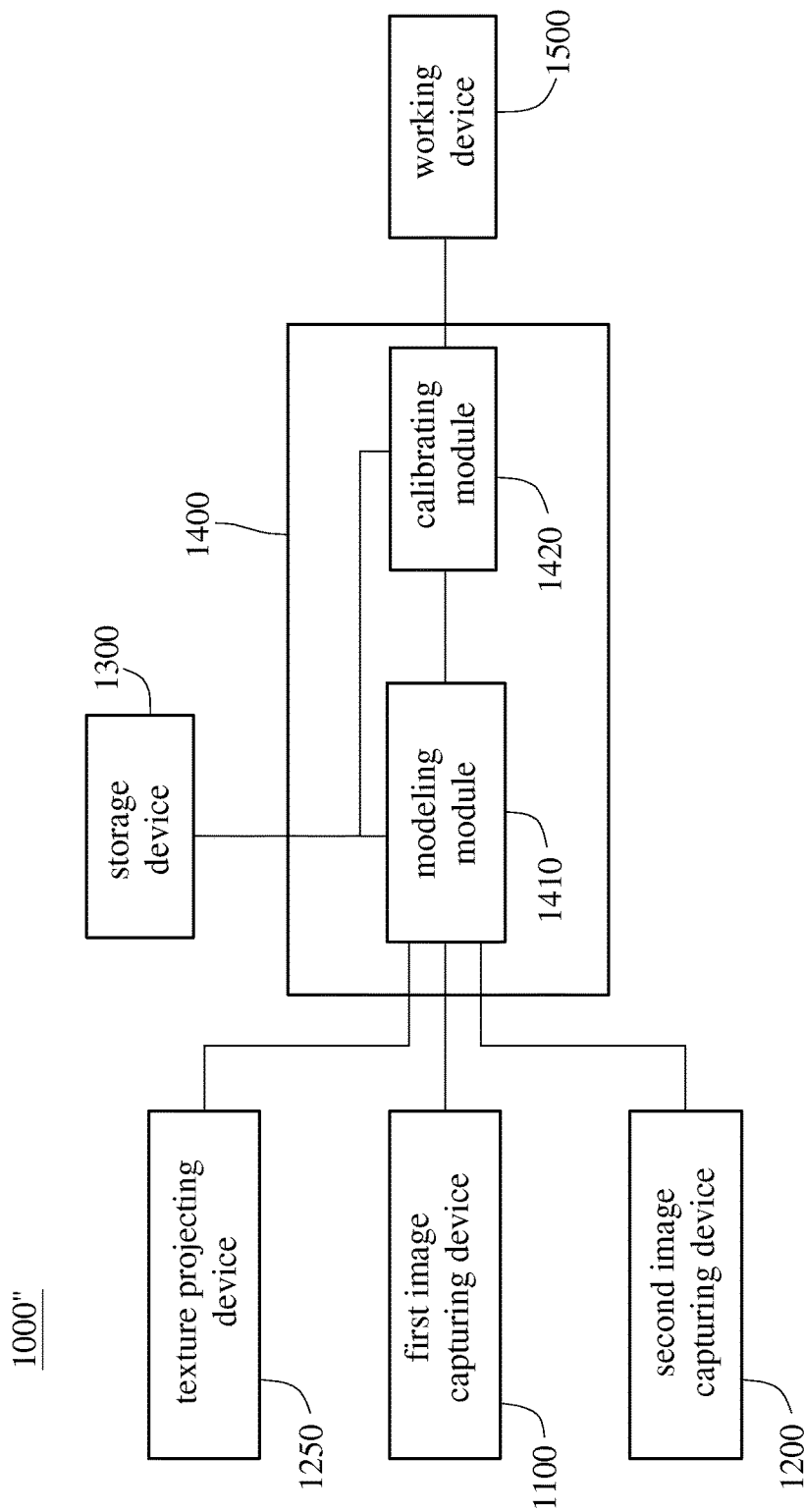
FIG. 5B is a functional block diagram of the automation machining apparatus in FIG. 5A.

In another embodiment, please refer to FIG. 5A and FIG. 5B, wherein FIG. 5A is for illustrating an automation machining apparatus in one embodiment, and FIG. 5B is a functional block diagram of the automation machining apparatus in FIG. 5A. Compared with the aforementioned embodiments corresponding to FIG. 1 through FIG. 3, the automation machining apparatus 1000" includes the first image capturing device 1100, the second image capturing device 1200, and a texture projecting device 1250. That is, the automation machining apparatus in the present embodiment utilizes the binocular 3D scanner and the texture projecting 3D scanner at the same time. Hence in one embodiment, the first image capturing device 1100 and the second image capturing device 1200 respectively capture image of the object 2000 when the texture projecting device 1250 is projecting spots onto the object 2000 so that the obtained stereoscopic image corresponding to the object 2000 in the embodiment is more accurate.

In yet another embodiment, the texture projecting device 1250 is used for projecting an alignment line onto the object 2000. After the first image capturing device 1100 and the second image capturing device 1200 capture the images of the object 2000, the alignment line in the images is used as the reference line so that the stereoscopic image corresponding to the object 2000 is built more accurate.

The working device 1500 then processes the object 2000 based on the machining parameter. In one embodiment, the first image capturing device 1100 and the second image capturing device 1200 are fixed and connected to the working device 1500. In other words, if the position of the working device 1500 and/or the view angle of the working device 1500 are adjusted so that the built second stereoscopic characteristic model corresponding to the object 2000 is substantially identical to the first stereoscopic characteristic model corresponding to the object 2000, the position relationship between the working device 1500 and the object 2000 is identical to the preset position relationship between the working device 1500 and the object 2000 in the stage of tuning the automation machining apparatus 1000. Hence, after the calibrating module 1420 in the controlling device 1400 controls the working device 1500 to shift and/or to rotate based on the calculated shifting matrix and the calculated rotating matrix, the stereoscopic characteristic model built based on the stereoscopic image obtained by the first image capturing device 1100 and the second image capturing device 1200 connected to the working device 1500 is substantially identical to the first stereoscopic characteristic model.

In another embodiment, when the first stereoscopic characteristic model corresponding to the object 2000 is built, a working image corresponding to the object 2000 is also obtained. The working image is a two-dimension image shot by the first image capturing device 1100 at the preset position in the stage of tuning the automation machining apparatus 1000. Because the two-dimension image corresponding to the object 2000 is obtained, so the two-dimension image shot when the object 2000 is processed can be converted to be identical to the working image by the aforementioned matrices.

In yet another embodiment, the controlling device 1400 calibrates the machining parameter in real-time. That is, for each object 2000, the controlling device 1400 immediately compares its second stereoscopic characteristic model with the first stereoscopic characteristic model to obtain the error parameter corresponding to the second stereoscopic characteristic model. Hence, for each object 2000 to be processed on the automatic production line, the machining parameter is calibrated and improved.

In certain embodiments, the controlling device 1400 does not calibrate the machining parameter in real-time, but calculates the displacement of the position of the automation machining apparatus 1000 and the displacement of the view angle of the automation machining apparatus 1000 based on a plurality of pieces of information so as to build the machining parameter for the next object to be processed. In the condition that the object is fixed in the particular position on the automatic production line, such method is capable of improving the machining parameter corresponding to the object 2000 while reducing the loading of calculation performed by the controlling device 1400.

In one embodiment, the first stereoscopic characteristic model is converted into a characteristic model overlapping the second stereoscopic characteristic model by the shifting matrix and/or the rotating matrix. In the embodiment, the spatial position of the first image capturing device 1100 and the spatial position of the second image capturing device 1200 are both fixed. Besides, neither the first image capturing device 1100 nor the second image capturing device 1200 is connected to and fixed on the working device 1500. The working device 1500 is set to process the object 2000 based on the first stereoscopic characteristic model. Hence, the shifting matrix and/or the rotating matrix can be used for calibrating and adjusting the position to process the object 2000.

In another embodiment, when the first stereoscopic characteristic model corresponding to the object 2000 is built, a working image corresponding to the object 2000 is also obtained. The working image is a two-dimension image shot by the first image capturing device 1100 at the preset position in the stage of tuning the automation machining apparatus 1000. Because the two-dimension image corresponding to the object 2000 is obtained, so the working image can be converted to be identical to the two-dimension image shot when the object 2000 is processed by the aforementioned matrices.

Figure 6:
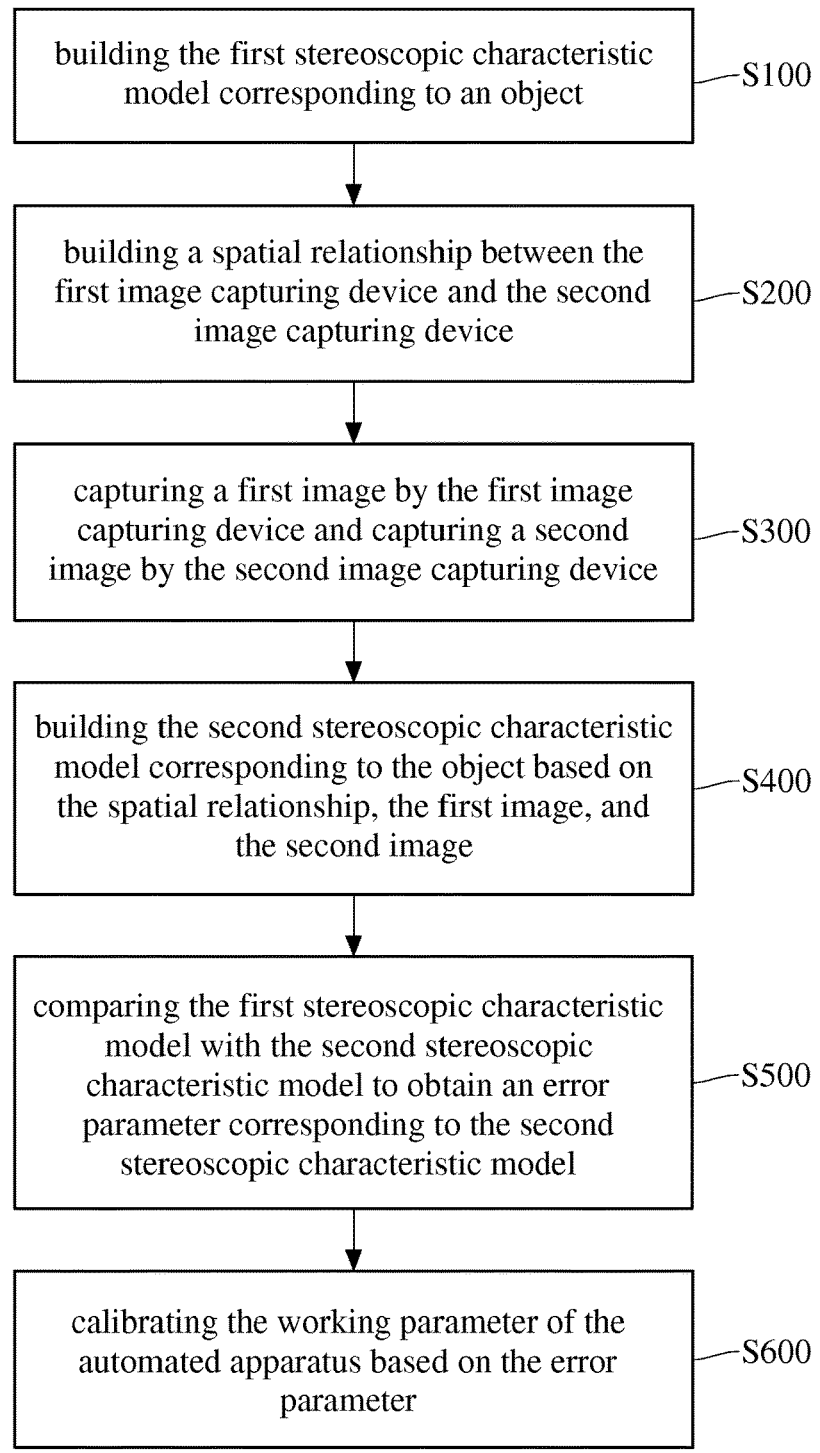
FIG. 6 is a flowchart of the calibration method in one embodiment.

That is, according to an embodiment, please refer to FIG. 2 and FIG. 6, wherein FIG. 6 is a flowchart of the calibration method in one embodiment. As shown in step S100, the first stereoscopic characteristic model corresponding to the object 2000 is built and stored in the storage device 1300. As shown in step S200, the spatial relationship between the first image capturing device 1100 and the second image capturing device 1200 is built and stored in the storage device 1300. As shown in step S300, a first image is captured by the first image capturing device 1100 and a second image is captured by the second image capturing device 1200. As shown in step S400, the modeling module 1410 builds the second stereoscopic characteristic model corresponding to the object 2000 based on the spatial relationship, the first image, and the second image. As shown in step S500, the calibrating module 1420 compares the first stereoscopic characteristic model with the second stereoscopic characteristic model to obtain an error parameter corresponding to the second stereoscopic characteristic model. As shown in step S600, the calibrating module 1420 calibrates the machining parameter of the automation machining apparatus 1000 based on the error parameter.

What is claimed is:

1. A calibration method applicable for an automation machining apparatus used in an automatic production line and performing processing actions to an object, the method comprising:
   building a first stereoscopic characteristic model corresponding to the object based on a standard first two-dimension image and a standard second two-dimension image obtained in a tuning stage by a control device of the automation machining apparatus;
   obtaining a stereoscopic image of the object based on a spatial relationship, a first two-dimension image and a second two-dimension image generated by photographing the object using two image capturing devices of the automation machining apparatus, wherein the spatial relationship is related to the two image capturing devices;
   building a second stereoscopic characteristic model corresponding to the object based on the stereoscopic image by the control device;
   obtaining at least one error parameter corresponding to the second stereoscopic characteristic model by comparing the second stereoscopic characteristic model with the first stereoscopic characteristic model by the control device;
   calibrating a machining parameter of the automation machining apparatus by converting the machining parameter to a new machining parameter with a coordinate conversion matrix based on the at least one error parameter by the control device; and
   controlling a work device to move to a position for machining on the object using the calibrated new machining parameter;
   wherein the first stereoscopic characteristic model comprises a plurality of pieces of first information corresponding to a plurality of first characteristic nodes on the object, each piece of first information comprising a first spatial position of the corresponding first characteristic node, and the second stereoscopic characteristic model comprises a plurality of pieces of second information corresponding to a plurality of second characteristic nodes on the object, each piece of second information comprising a second spatial position of the corresponding second characteristic node, and the plurality of first characteristic nodes are respectively corresponding to the plurality of second characteristic nodes;
   the error parameter specifies differences in spatial positions of characteristic nodes on the object between the first and second stereoscopic characteristic models; and
   the coordinate conversion matrix is calculated based on the differences in spatial positions of characteristic nodes between the first and second stereoscopic characteristic models;
   wherein calibrating the machining parameter with the coordinate conversion matrix comprises adjusting a position for obtaining the stereoscopic image of photographing the object.

2. The method of claim 1, wherein the coordinate conversion matrix is used for converting the plurality of first spatial positions into the plurality of second spatial positions.

3. The method of claim 2, wherein the machining parameter comprises a plurality of spatial working positions of the object, and calibrating the machining parameter with the coordinate conversion matrix comprises converting the plurality of spatial working positions by the coordinate conversion matrix to obtain a plurality of converted spatial working positions.

4. The method of claim 1, wherein the coordinate conversion matrix is used for converting the plurality of second spatial positions into the plurality of first spatial positions.

5. An automation machining apparatus, used in an automatic production line and performing processing actions to an object, comprising:
   a plurality of image capturing devices for obtaining a stereoscopic image of an object based on a spatial relationship, a first two-dimension image and a second two-dimension image generated by photographing the object, with the spatial relationship related to the plurality of image capturing devices;
   a storage device for storing a first stereoscopic characteristic model built based on a standard first two-dimension image and a standard second two-dimension image of the object in a tuning stage;
   a controlling device electrically coupled to the image capturing device and the storage device, the controlling device for building a second stereoscopic characteristic model of the object based on the stereoscopic image, and
   the controlling device for obtaining an error parameter by comparing the first stereoscopic characteristic model with the second stereoscopic characteristic model, and for calibrating a machining parameter of the automation machining apparatus by converting the machining parameter to a new machining parameter with a coordinate conversion matrix based on the error parameter; and
   a working device electrically coupled to the controlling device and for being controlled to move to a position for machining on the object using the calibrated new machining parameter;
   wherein the first stereoscopic characteristic model comprises a plurality of pieces of first information corresponding to a plurality of first characteristic nodes on the object, each piece of first information comprising a first spatial position of the corresponding first characteristic node, and the second stereoscopic characteristic model comprises a plurality of pieces of second information corresponding to a plurality of second characteristic nodes on the object, each piece of second information comprising a second spatial position of the corresponding second characteristic node, and the plurality of first characteristic nodes are respectively corresponding to the plurality of second characteristic nodes;
   the error parameter specifies differences in spatial positions of characteristic nodes on the object between the first and second stereoscopic characteristic models;
   the coordinate conversion matrix is calculated based on the differences in spatial positions of characteristic nodes between the first and second stereoscopic characteristic models; and
   a position for obtaining the stereoscopic image of photographing the object is adjusted based on the coordinate conversion matrix to calibrate the machining parameter.

6. The apparatus of claim 5, wherein the coordinate conversion matrix is used for converting the plurality of first spatial positions into the plurality of second spatial positions, and the machining parameter comprises a plurality of spatial working positions, and the controlling device converts the plurality of spatial working positions with the coordinate conversion matrix to obtain a plurality of converted spatial working positions.

7. The apparatus of claim 5, wherein the coordinate conversion matrix is used for converting the plurality of second spatial positions into the plurality of first spatial positions, and the machining parameter comprises a position relationship between the working device and the object, and the controlling device adjusts a position of the working device based on the coordinate conversion matrix so as to calibrate the machining parameter.

8. The apparatus of claim 5, wherein the image capturing device is selected from the group consisting of a binocular 3D scanner and a texture projecting 3D scanner.

* * * * *